H. P. HASKIN.
Slaughtering Elevator.
No. 61,736.
Patented Feb. 5, 1867.
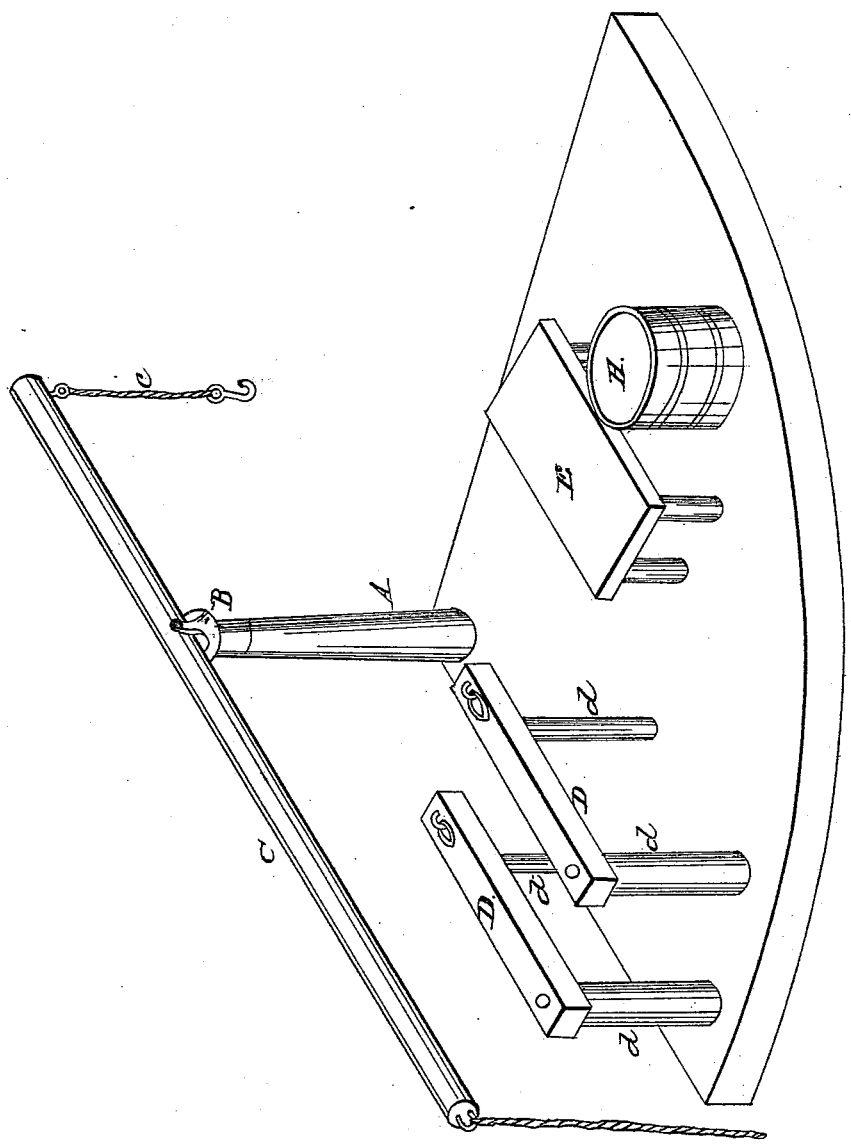
Witnesses:
D. W. Castle
H. P. Strong
Inventor:
Henry P. Haskin

United States Patent Office.

HENRY P. HASKIN, OF ROSCOE, ILLINOIS.

Letters Patent No. 61,736, dated February 5, 1867.

IMPROVEMENT IN APPARATUS FOR HANDLING HOGS IN SLAUGHTERING.

*The Schedule referred to in these Letters Patent and making part of the same.*

TO ALL WHOM IT MAY CONCERN:

Be it known that I, HENRY P. HASKIN, of Roscoe, Winnebago county in the State of Illinois, have invented a new and useful Apparatus for Handling Hogs and other Animals in Process of Slaughtering; and I do hereby declare that the following is a full and exact description thereof, which will enable any one skilled in the art to make and use the same, reference being had to the accompanying drawings and to the letters of reference marked thereon, and making a part of this specification, in which—

Letter A represents the post, with the revolving metallic socket cap-clasp B supporting the swinging lever C with the chain and hook $c$, having a suitable rope pendent from the long end thereof, by means of which said lever is operated. H is the scalding-tub; E the table on which hogs are dressed. D are holding-bars, on which the slaughtered animals are suspended, after being dressed, by sliding the gambrels on to and back to the pivoted ends of the said bars D. $d$ are posts, supporting the same. After the hog is killed, the hook $c$ is made fast to the lower jaw, and the animal swung into the lower tub H, and, when sufficiently scalded, is deposited on the table E, and dressed. The gambrel is then applied, to which the hook $c$ is attached. The animal is then hoisted, when the internal dressing is performed. The gambrel is then placed on the end of the bar D just over the link; which, having been thrown over towards the post $d$, into which the hook $c$ is inserted, and operating the lever C, the end of the bar D is raised up to a suitable angle, so that the gambrel will slide. By a lateral motion of the lever the bar D is moved sidewise, and the animal allowed to slide to the rear end of the said bar D; and by similar use of the said apparatus the bar D is lowered and returned to its normal position on the top of the post $d$ nearest the said post A. Any available number of such bars may be used to accommodate the business of the operator. This device affords excellent facilities for handling beef cattle. Convenience and cheapness reccommend its use.

What I claim as my invention, and desire to secure by Letters Patent, is—

The bars D and $d$, in combination with the lever C, revolving socket B, and post A, when constructed substantially as described, when arranged and operating as and for the purpose specified.

HENRY P. HASKIN.

Witnesses:
D. W. C. CASTLE,
H. P. STRONG.